US011367583B2

(12) United States Patent
Iritani et al.

(10) Patent No.: US 11,367,583 B2
(45) Date of Patent: Jun. 21, 2022

(54) SEESAW TYPE OPERATION UNIT USED FOR ZOOMING OPERATION IN VIDEO CAMERA AND ELECTRONIC DEVICE

(71) Applicant: CANON KABUSHIKI KAISHA, Tokyo (JP)

(72) Inventors: Yuko Iritani, Tokyo (JP); Yoshinobu Shibayama, Kanagawa (JP); Yasuhiro Kojima, Tokyo (JP); Shigeharu Aoki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/172,515

(22) Filed: Feb. 10, 2021

(65) Prior Publication Data

US 2021/0257171 A1  Aug. 19, 2021

(30) Foreign Application Priority Data

Feb. 18, 2020 (JP) .............................. JP2020-025439
Feb. 20, 2020 (JP) .............................. JP2020-027020

(51) Int. Cl.
*H01H 21/22* (2006.01)
*H01H 21/36* (2006.01)
(Continued)

(52) U.S. Cl.
CPC ............ *H01H 21/22* (2013.01); *H01H 21/04* (2013.01); *H01H 21/36* (2013.01);
(Continued)

(58) Field of Classification Search
CPC ........ H01H 21/22; H01H 21/04; H01H 21/36; H01H 2231/046
(Continued)

(56) References Cited

U.S. PATENT DOCUMENTS

| 5,239,205 A * | 8/1993 | Hoffman | H02J 13/0075 |
| | | | 307/117 |
| 7,945,991 B2 * | 5/2011 | Hamm | H01H 9/061 |
| | | | 15/339 |
| 9,799,469 B2 * | 10/2017 | Bailey | H01H 23/145 |

FOREIGN PATENT DOCUMENTS

JP  2011100005 A  5/2011
JP  5502415 B2  5/2014

* cited by examiner

*Primary Examiner* — Edwin A. Leon
*Assistant Examiner* — Iman Malakooti
(74) *Attorney, Agent, or Firm* — Rossi, Kimms & McDowell LLP

(57) ABSTRACT

A seesaw type operation unit having a new configuration is provided. A swinging member is capable of swinging in a predetermined direction with a rotation axis at a center. An urging member urges the swinging member to a neutral position. A detector includes a rotating portion which is arranged coaxially with the rotation axis and rotates integrally with the swinging member, and outputs a signal depending on a rotation amount of the rotating portion. An operating member receives an operation from an outside and causes the swinging member to rotate in the predetermined direction by the operation. A supporting member rotatably and coaxially supports the swinging member and the operating member. In a case where the operating member is rotated in the predetermined direction, the operating member pushes an end of the swinging member to rotate the operating member, the swinging member, and the rotating portion integrally with one another.

11 Claims, 20 Drawing Sheets

(51) Int. Cl.
*H01H 21/04* (2006.01)
*H04N 5/225* (2006.01)
*H04N 5/232* (2006.01)

(52) U.S. Cl.
CPC ..... *H01H 2231/046* (2013.01); *H04N 5/2251* (2013.01); *H04N 5/23296* (2013.01)

(58) Field of Classification Search
USPC ........................................................ 200/339
See application file for complete search history.

SEESAW TYPE OPERATION UNIT USED FOR ZOOMING OPERATION IN VIDEO CAMERA AND ELECTRONIC DEVICE

BACKGROUND OF THE INVENTION

Field of the Invention

The present invention relates to a seesaw type operation unit used for a zooming operation and so on in a video camera, and an electronic device including the operation unit.

Description of the Related Art

In general, the video camera has a zooming function for arbitrarily changing a shooting angle to a telephoto side or a wide-angle side by a user. For an electric zooming operation, a seesaw type operating member capable of swinging about a rotation axis is widely used. The seesaw type operating member has a neutral position to which the seesaw type operating member is urged by a spring, and is capable of being tilted for a determined angle in a clockwise direction or a counterclockwise direction. In the video camera, a zooming operation to the wide-angle side is performed when a vicinity of a one end of the seesaw type operating member is pushed into a main body side of the video camera, and a zooming operation to the telephoto side is performed when a vicinity of the another end of the seesaw type operating member is pushed into the main body side of the video camera. Moreover, in the video camera, the seesaw type operating member is used as an input means to variably change a speed of the zooming operation to the telephoto side or the wide-angle side.

Some of such type of the seesaw type operating member includes a component comprised of a PET film based flexible board on which a resistance band is printed. A rotational position of a lever, which is a member actually operated by the user, in the seesaw type operating member is detected from a resistance value obtained when the resistance band is used as a variable resistance and the resistance band comes into contact with a contact piece. For example, the contact piece is provided in a cam which is arranged inside the lever so as to swing in conjunction with the lever. If a position of the contact piece being in contact with the resistance band changes depending on a rotation amount (rotation angle) when the lever is operated, the rotation amount of the lever is detected (For example, see Japanese Laid-Open Patent Publication (kokai) No. 2011-100005).

SUMMARY OF THE INVENTION

The present invention provides a seesaw type operation unit having a new configuration and an electronic device.

Accordingly, the present invention provides an operation unit comprising a swinging member capable of swinging in a predetermined direction with a rotation axis at a center, an urging member that urges the swinging member to a neutral position, a detector that includes a rotating portion which is arranged coaxially with the rotation axis and rotates integrally with the swinging member, and outputs a signal depending on a rotation amount of the rotating portion, an operating member that receives an operation from an outside and causes the swinging member to rotate in the predetermined direction by the operation, and a supporting member that rotatably supports the swinging member and the operating member coaxially with each other, wherein in a case where the operating member is rotated in the predetermined direction, the operating member pushes an end of the swinging member to rotate the operating member, the swinging member, and the rotating portion integrally with one another.

According to the present invention, the seesaw type operation unit having a new configuration is provided.

Further features of the present invention will become apparent from the following description of exemplary embodiments with reference to the attached drawings.

BRIEF DESCRIPTION OF THE DRAWINGS

FIGS. 9A and 9B are views of the operation unit in FIG. 1, in which FIG. 9A shows a side view and FIG. 9B shows a cross-sectional view.

FIGS. 16A and 16B are views of a video camera according to a third embodiment of the present invention, in which FIG. 16A shows a side view and FIG. 16B shows a partial cross-sectional view.

FIGS. 20A and 20B are views of a video camera according to a fifth embodiment of the present invention, in which FIG. 20A shows a side view and FIG. 20B shows a partial cross-sectional view.

DESCRIPTION OF THE EMBODIMENTS

The present invention will now be described in detail below with reference to the accompanying drawings showing embodiments thereof.

First Embodiment

In the present embodiment, a seesaw type operation unit which detects a rotation amount of a lever by a phase detection using a rotary potentiometer will be explained. In the seesaw type operation unit, since various types of forces such as a pressing force and a frictional force act on a contact point which moves in conjunction with the lever, a contact state between the contact point and a resistance band does not become stable, and thus an output abnormality is likely to occur. To avoid this problem, a method of detecting the rotation amount of the lever by the phase detection using the rotary potentiometer is conceivable. However, when the rotary potentiometer is used, a structural part and a soldering mounting part of the rotary potentiometer may be damaged due to a force acting through the lever. In the present embodiment, the seesaw type operation unit which is not likely to be damaged by an external force.

Figure 1:
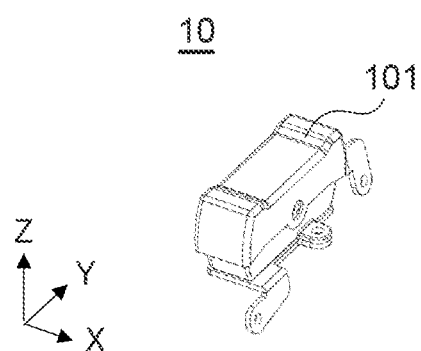
FIG. 1 is an external perspective view of an operation unit according to a first embodiment of the present invention.
Figure 2A:
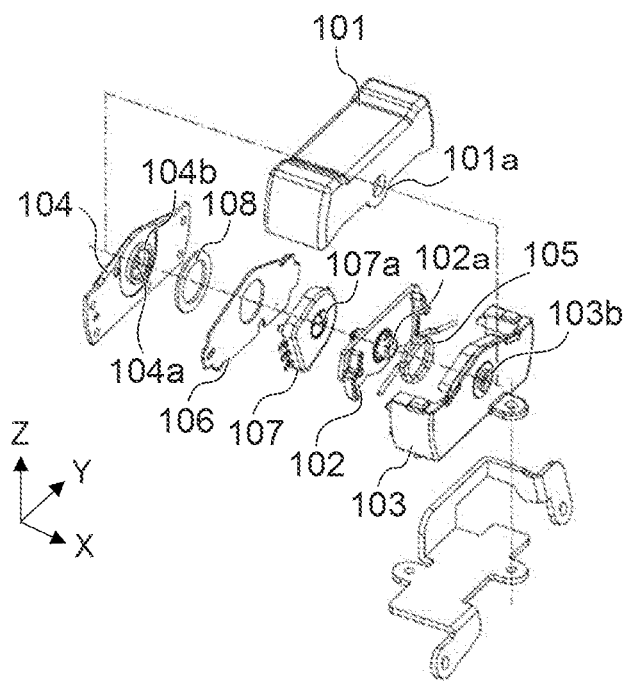
FIGS. 2A and 2B are exploded perspective views of the operation unit in FIG. 1.
Figure 2B:
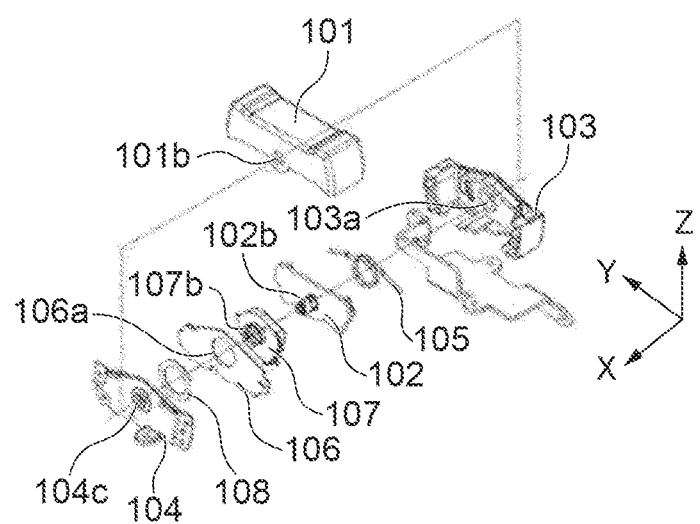

FIG. 1 is an external perspective view of a seesaw type operation unit 10 (hereinafter, referred to as the "operation unit 10") according to a first embodiment of the present invention. FIGS. 2A and 2B are exploded perspective views of the operation unit 10 in FIG. 1. As is clear from coordinate axes in FIGS. 2A and 2B, directions to view the operation unit 10 are different in FIG. 2A and FIG. 2B.

It should be noted that for convenience of explanation, an X-axis, a Y-axis, and a Z-axis which are mutually perpendicular are defined as shown in FIGS. 1, 2A, and 2B. Moreover, for convenience of explanation, a positive direction in the X-axis is defined as a "front", a negative direction in the X-axis is defined as a "back", a positive direction in the Y-axis is defined as defined as a "right (side)", a negative direction in the Y-axis is defined as a "left (side)", a positive direction in the Z-axis is defined as an "upper (side)", and a negative direction in the Z-axis is defined as a "lower (side)". Furthermore, the "CW (clockwise) direction" and a "CCW (counterclockwise) direction" are defined as rotational directions as viewed from the front (the positive direction in the X-axis).

The operation unit 10 includes a lever 101, a cam plate 102, a holder 103, a cover 104, a neutral spring 105, a circuit board 106, a rotary potentiometer 107, and an elastic cushion 108.

The lever 101 is an operation member which a user actually touches an operates from an outside, and includes hole portions 101a and 101b which are a rotation center of a swinging movement. The cam plate 102 is a tabular-shaped swinging member which swings by the lever 101. A swinging rotation axis 102a which projects into the front is provided on a front surface of the cam plate 102, and a swinging rotation axis 102b which projects into the back is provided on a back surface of the cam plate 102.

The holder 103 and the cover 104 act as support members which rotatably support the lever 101 and the cam plate 102. More specifically, the holder 103 is arranged on the front side of the cam plate 102, and the cover 104 is arranged on the back side of the cam plate 102. The swinging rotation axes 102a and 102b are swingably fitted and supported by a bearing hole 103a provided inside the holder 103 and a bearing hole 104a provided on the cover 104, and held coaxially as to rotation. It should be noted that a stopper cushioning 109 (see FIG. 3B) is provided on the holder 103.

The neutral spring 105 is an urging member which is arranged between the cam plate 102 and the holder 103. When the lever 101 is operated, the neutral spring 105 is deformed to cause the cam plate 102 to swing in the CW direction and the CCW direction with respect to the holder 103. The neutral spring 105 is incorporated in the operation unit 10 so that the neutral spring 105 returns the position of the cam plate 102 (lever 101) to a neutral position when the lever 101 is not operated.

A base of the swinging rotation axis 102b of the cam plate 102 is lightly pressed into a rotating portion 107a of the rotary potentiometer 107 mounted on the circuit board 106. Accordingly, when the cam plate 102 swings, the rotating portion 107a of the rotary potentiometer 107 rotates depending on a rotation amount (rotation angle) of the cam plate 102. A mounting surface (front) of the rotary potentiometer 107 is provided with a sleeve-shaped portion 107b (fitting portion). The sleeve-shaped portion 107b penetrates an opening 106a provided on the circuit board 106 and engages with a fitting convex portion 104b provided on an outer circumference of the bearing hole 104a of the cover 104.

As described above, the cam plate 102 is axially supported by the holder 103 and the cover 104, the rotary potentiometer 107 is fitted with the cover 104 by sleeves, and the rotating portion 107a is lightly pressed into the cam plate 102. Therefore, a misalignment of the coax between a swinging center of the cam plate 102 and the rotating portion 107a does not occur. The operation unit 10 is thus configured so that a variation in a rotational load on the rotary potentiometer 107 does not occur when the cam plate 102 swings.

The elastic cushion 108 is an elastic member which is compressed and sandwiched by the circuit board 106 and the cover 104 and suppresses occurrence of a rattling in the circuit board 106 in a state where the circuit board 106 is incorporated in the operation unit 10. The hole portions 101a and 101b rotatably fit with the bearing portion 103b provided on an outer side of the holder 103 and a cover rotation axis 104c provided on an outer side of the cover 104, respectively.

Figure 3A:
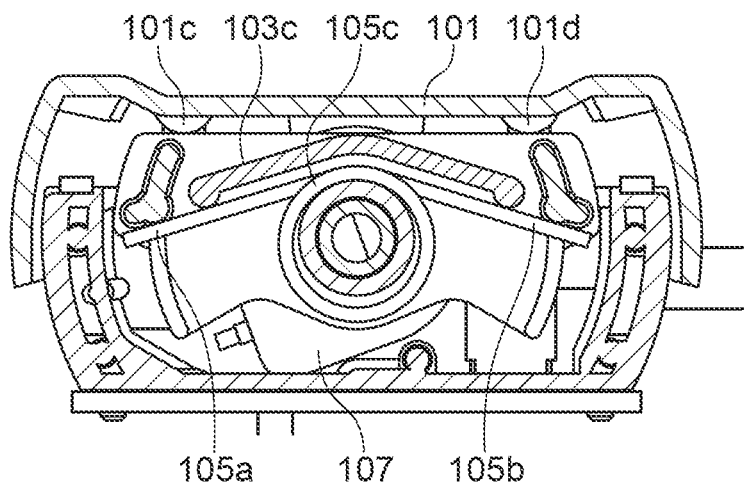
FIGS. 3A to 3C are cross-sectional views of the operation unit in FIG. 1.
Figure 3B:
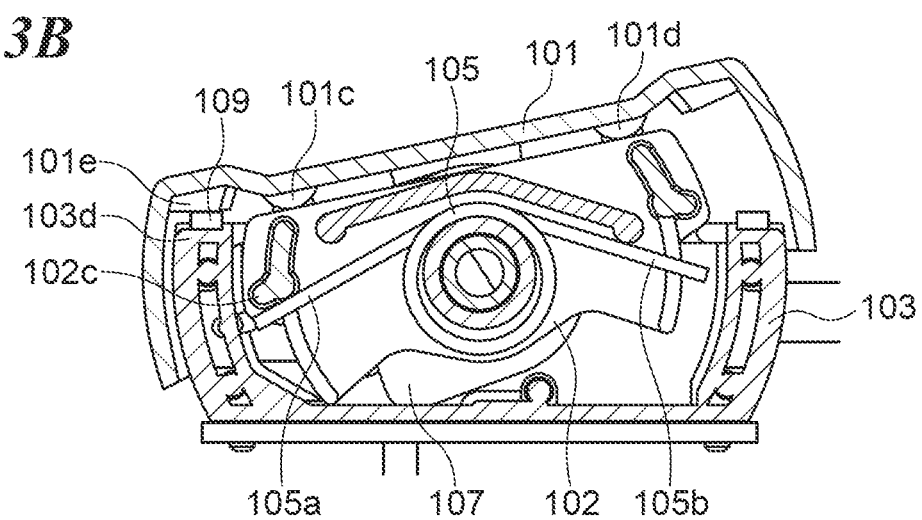
Figure 3C:
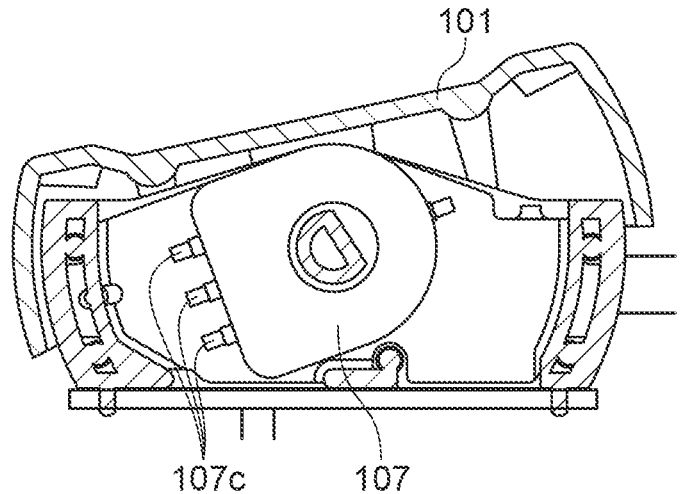

FIGS. 3A to 3C are cross-sectional views of the operation unit 10. In FIG. 3A, the lever 101 is in a non-operation state. FIGS. 3B and 3C respectively show different cross sections of the lever 101 in the same operation state.

Convex-shaped portions 101c and 101d are provided on both of left and right sides of an inner side of a top face of the lever 101. Arm portions 105a and 105b of the neutral spring 105 abut a spring receiving portion 103c provided in the holder 103, and a coil portion 105c of the neutral spring 105 is arranged in the vicinity of the rotation axis.

When the lever 101 is rotated as shown in FIG. 3B, the convex-shaped portion 101c pushes an end of the cam plate 102 to rotate the cam plate 102. On this occasion, a spring receiving portion 102c provided in the cam plate 102 presses the arm portion 105a of the neutral spring 105. As a result, the lever 101 (cam plate 102) is constantly subjected to a force to return to the neutral position by the neutral spring 105 while the lever 101 is operated. Moreover, FIG. 3B shows a state in which a stopper 101e provided on the top face of the lever 101 comes into contact with a stopper bearing portion 103d provided in the holder 103 via the stopper cushioning 109, and the lever 101 is rotated to a rotation limit in the CCW direction.

As described above, in the operation unit 10, the lever 101 is not formed integrally with the cam plate 102, and the cam plate 102 is pressed in a rotational direction by pressing the lever 101 in the rotational direction. In a case where the lever 101 is twisted, a central portion of a longitudinal direction of the lever 101 or the whole lever 101 is pressed in the negative direction in the Z-axis, or the lever 101 is pressed in an X-Y plane, a force from a direction other than the rotational direction acts on the lever 101. Even when the force from the direction other than the rotational direction acts on the lever 101, the operation unit 10 is able to receive the force by the bearing portions of the holder 103 and the cover 104, and thus the force from the direction other than the rotational direction does not act on the cam plate 102. Accordingly, an unreasonable load is not applied to the rotary potentiometer 107 which operates in conjunction with rotation of the cam plate 102, and thus a damage to the rotary potentiometer 107 due to an external static pressure is prevented from occurring.

In general, a wiring lead portion 107c which is soldered to the circuit board 106 is provided on one side of the rotary potentiometer 107 as shown in FIG. 3C. The wiring lead portion 107c is often arranged on a position farthest from the rotation center in the rotary potentiometer 107. In the operation unit 10, the wiring lead portion 107c is arranged substantially parallel to an inclination (orientation) of the lever 101 in a state where the lever 101 is rotated to the rotation limit instead of being arranged on a lower side when viewed from the rotation axis. Therefore, a part of the wiring lead portion 107c which extends in one direction overlaps with the lever 101 in the view shown in FIG. 3C. As a result, a height of the operation unit 10 is kept low (a length in a direction of the Z-axis is shorten), the operation unit 10 is downsized.

Figure 4:
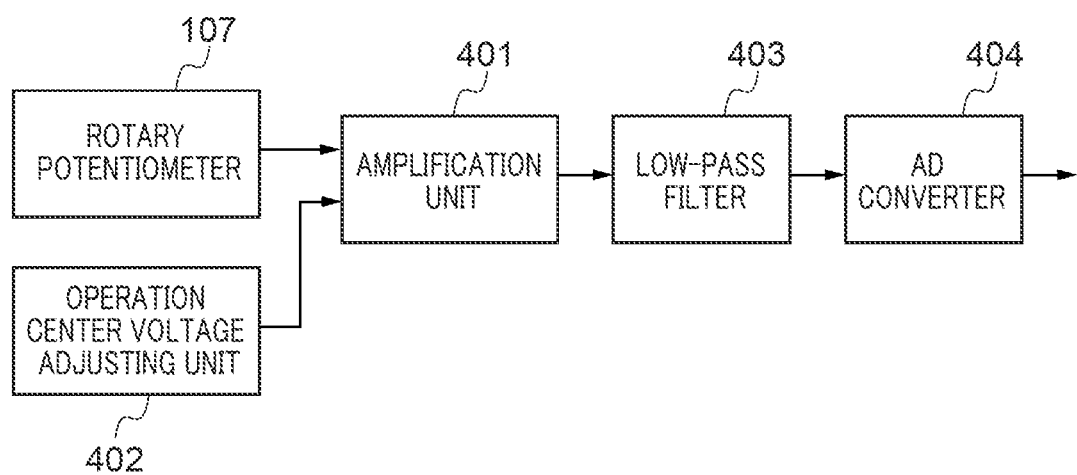
FIG. 4 is a diagram showing a configuration of a rotation amount detecting unit which detects a rotation amount of a lever of the operation unit in FIG. 1.

FIG. 4 is a diagram showing a configuration of a system (hereinafter referred to as "a rotation amount detecting unit") (detector) which detects a rotation amount of the rotating portion 107a of the rotary potentiometer 107 as a digital value. An output signal from the rotary potentiometer 107 is subjected to a voltage amplification by an amplification unit (amplifier) 401. A voltage of an operation center in the voltage amplification is determined by an operation center voltage adjusting unit 402. The signal which has been subjected to the voltage amplification by the amplification unit 401 is input to an AD converter 404 through a low-pass filter 403, and converted into a digital signal. By reading the obtained digital signal by, for example, a CPU (microcomputer), the rotation amount of the rotary potentiometer 107 is detected.

A potential of a signal output from the rotary potentiometer 107 varies in proportion to the rotation amount of the rotary potentiometer 107. An electric rotation angle of the rotary potentiometer 107 ranges from 0° (degree) to several hundred degrees, whereas the rotation range of the lever 101 is defined within several tens of degrees even when the lever 101 is rotated from the rotation limit in the CW direction to the rotation limit in the CCW direction. Therefore, since an output voltage of the rotary potentiometer 107 falls within a narrow range, a resolution of the output signal from the rotary potentiometer 107 is low even if the output signal as-is is subjected to an AD conversion. Accordingly, the voltage amplification of the output signal from the rotary potentiometer 107 is performed by the amplification unit 401. The amplification unit 401 adjusts the voltage of the operation center of the voltage amplification becomes equal to an output voltage in a state where the lever 101 is in the neutral position, and controls the voltage of the operation center to half of a range of an input voltage of the AD conversion. As a result, the resolutions in the CW direction and the CCW direction are made equal. By passing the signal subjected to the voltage amplification to the low-pass filter 403, an operation noise of the lever 101 and an electric noise and so on occurred due to a disturbance are reduced. The rotation amount of the lever 101 is detected as the digital value by subjecting the output signal from low-pass filter 403 to the AD conversion in the AD converter 404.

Figure 5:
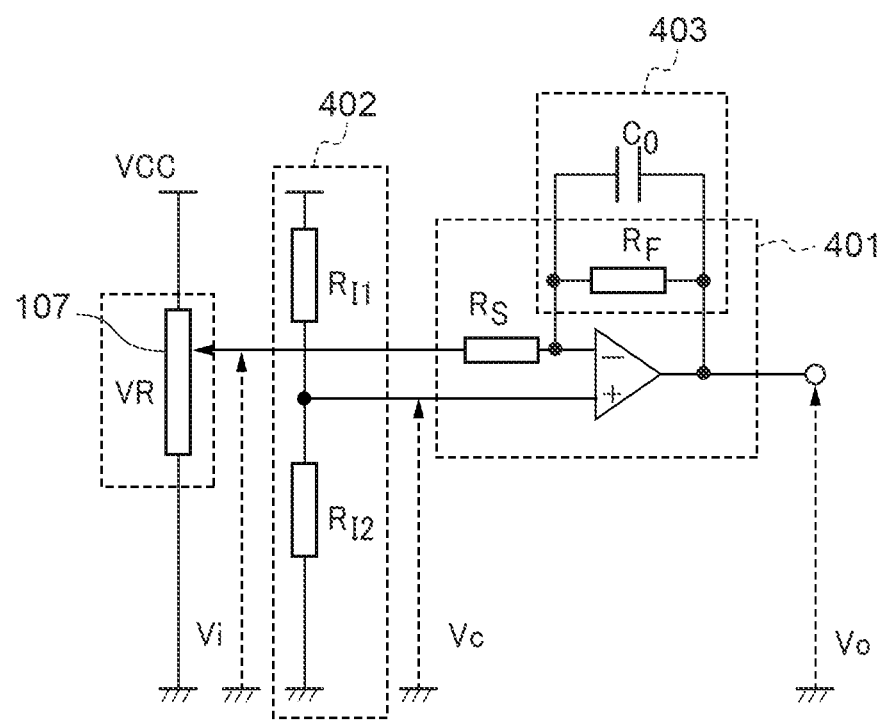
FIG. 5 is a circuit diagram showing the configuration of the rotation amount detecting unit in FIG. 4.

FIG. 5 is a diagram showing a circuit configuration of the rotation amount detecting unit in FIG. 4. The rotary potentiometer 107 is a type of variable resistors. In the rotary potentiometer 107, a resistance value between a GND and an intermediate terminal changes depending on the rotation amount of the rotating portion 107a, and accordingly, an output voltage Vi changes. A center voltage is set in an operation center voltage adjusting unit 402 based on a partial pressure of resistances $R_{11}$ and $R_{12}$. When resistance values of the resistances $R_{11}$ and $R_{12}$ are equal, a center voltage Vc is VCC/2. It should be noted that, a method of setting the voltage of the operation center is not limited to a method using the partial pressure of the resistance, and for example, another voltage of another power source may be set as the voltage of the operation center.

A differential amplifier circuit using an OP amplifier is used as the amplification unit 401. A ratio of voltage amplification is determined by resistances $R_F$ and $R_S$. The ratio of voltage amplification is determined so that an output voltage at a time when the lever 101 is rotatably operated from the rotation limit in the CW direction to the rotation limit in the CCW direction falls within a range of an input voltage in the AD conversion. That is, a range of the output voltage from the amplification unit 401 is set smaller than the range of the input voltage to the AD converter 404. As a result, the output signal is not clipped, and the resolution in the AD conversion can be secured. Moreover, by configuring the low-pass filter 403 to have a capacity $\gamma_F$ and the resistance $R_F$, a cut-off frequency of the low-pass filter 403 can be set equal to or less than several tens of Hz. As a result, the operation noise and the noise in the electric circuit can be reduced.

By configuring the rotation amount detecting unit as described above, it is possible to obtain the output signal $V_o$ with the resolution in the AD conversion being secured. It should be noted that the configuration to amplify the output voltage Vi is not limited to an amplification circuit using an OP amplifier, and the configuration of the low-pass filter 403 is also not limited to the configuration having the capacity $\gamma_F$ and the resistance $R_F$.

Figure 6:
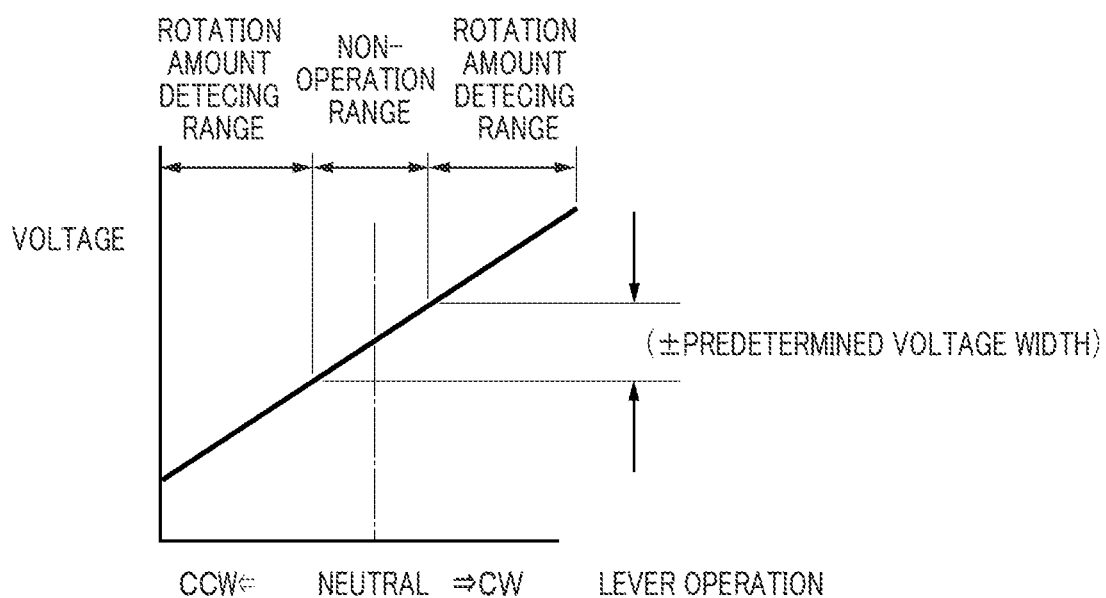
FIG. 6 is a diagram showing a relationship between the rotation amount of the lever and an output voltage in the rotation amount detecting unit.

FIG. 6 is a diagram showing a relationship between the rotation amount of the lever 101 and the output voltage from the rotary potentiometer 107 in the rotation amount detecting unit. The rotary potentiometer 107 outputs a voltage signal depending on the rotation amount of the lever 101. In this case, a value of the output voltage from the rotary potentiometer 107 linearly changes according to the rotation amounts in the CW direction and the CCW direction, respectively.

The output voltage from the rotary potentiometer 107 when the lever 101 is in the neutral position varies due to various factors such as an individual difference and a variation in an assembling state of the rotary potentiometer 107, and a variation influenced by a surrounding environment. A voltage blind zone (dead band) is provided so that an operation to the lever 101 is not detected due to the variation of the output voltage even though the lever 101 is not operated actually. The voltage blind zone is provided within a range of a reference value±a predetermined voltage, and a performance corresponding to the operation to the lever 101 of a device equipped with the operation unit 10 is not executed in a case where the voltage in the voltage blind zone is detected. An output voltage at a time of the non-operation state of the lever 101 is used for the reference value. In a case where an output voltage out of the voltage blind zone is detected, it is determined that the lever 101 is operated, the rotation amount of the lever 101 is obtained, and the performance corresponding to the operation to the lever 101 is executed in the device equipped with the operation unit 10 in accordance with the obtained rotation amount.

Next, a description will be given of a mounting state of the circuit board 106 and the rotary potentiometer 107 with respect to the holder 103. When the rotary potentiometer 107 is mounted on the circuit board 106, a mounting misalignment occurs. That is, there is a risk to mount the rotary potentiometer 107 on the circuit board 106 with a misalignment in the CW direction or the CCW direction.

When the circuit board 106 on which the rotary potentiometer 107 is mounted is attached to the holder 103, a positioning is conventionally performed in general in the following way. That is, a positioning hole is provided in the circuit board 106, a positioning boss is provided in the holder 103, and the positioning hole and the positioning boss are fitted with each other. However, a machining accuracy of the positioning hole in the circuit board 106 cannot be regarded as reliable, and as a result, the circuit board 106 is attached to the holder 103 with the misalignment in the CW direction or the CCW direction.

If the rotary potentiometer 107 is thus misaligned with respect to the holder 103 in the CW direction or the CCW direction, the rotary potentiometer 107 makes a misdetection that the lever 101 is swinging even when the lever 101 is in the neutral position. As a method to prevent such misdetection, it is effective to widen a detection range for the lever 101 in the neutral position. However, if the detection range is widened, a problem that the voltage blind zone is also widened occurs.

Figure 7:
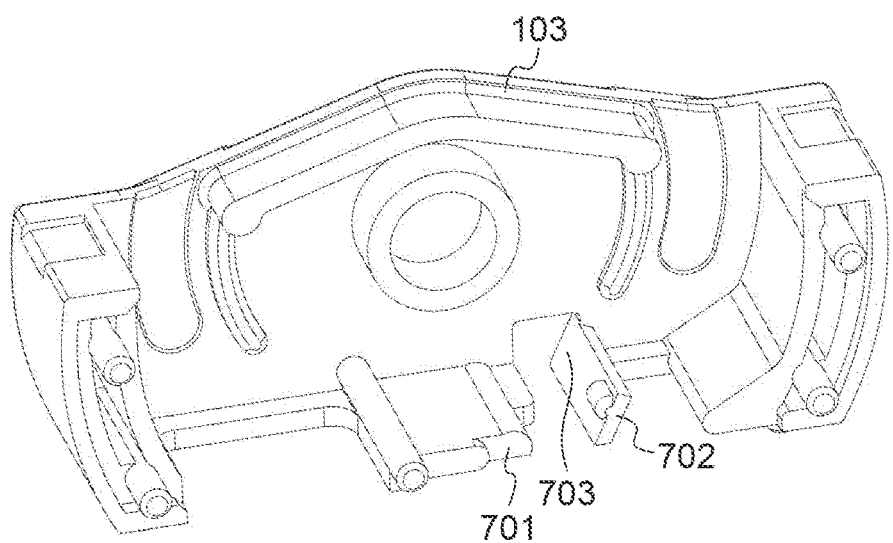
FIG. 7 is an external perspective view of a holder which constitutes the operation unit in FIG. 1.

To cope with this problem, in the present embodiment, the voltage blind zone in a state where the lever 101 is in the neutral position is narrowed in the following way. FIG. 7 is an external perspective view of the holder 103. The holder 103 includes a rigid urging portion 701 and an elastic urging portion 702 that regulate the positions of the circuit board 106 and rotary potentiometer 107. The rigid urging portion 701 has a rigidity and is thus hard to be deformed. On the other hand, the elastic urging portion 702 includes a plate-shaped plate spring portion 703 to have an elasticity and applies an urging force in a direction to be restored when the elastic urging portion 702 is pressed.

Figure 8:
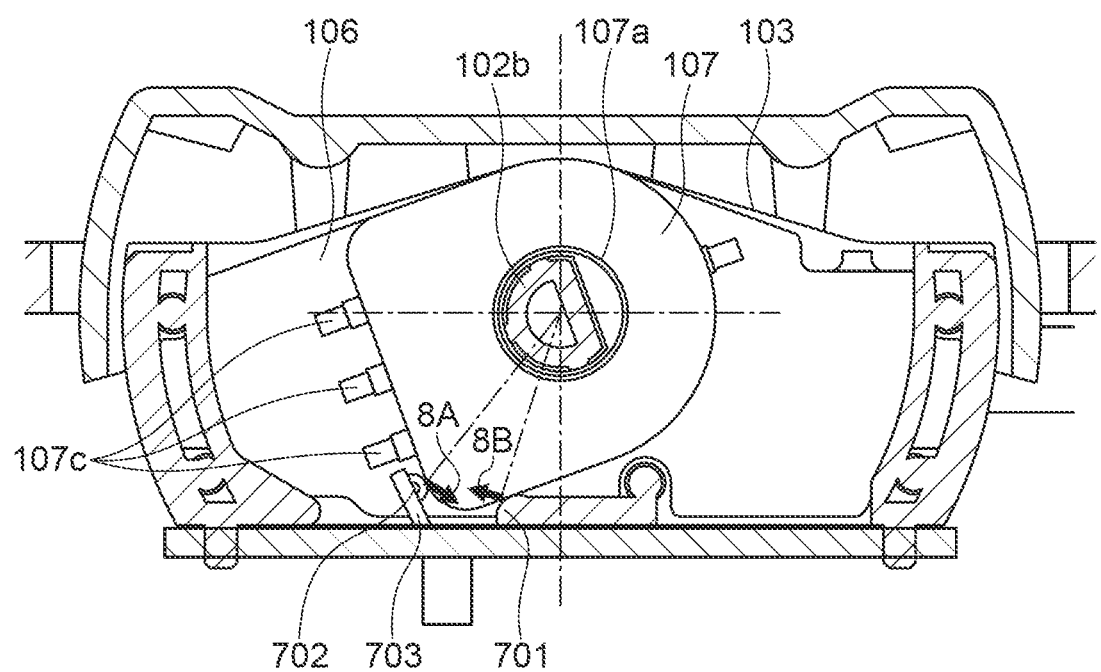
FIG. 8 is a cross-sectional view showing a state in which the lever of the operation unit in FIG. 1 is in a neutral position.

FIG. 8 is a cross-sectional view showing the operation unit 10 in a case where the lever 101 is in the neutral position. For convenience of explanation, directions in which the rigid urging portion 701 and the elastic urging portion 702 apply the urging forces are shown by an arrow 8B and arrow 8A, respectively.

As described above, the rotation axis of the cam plate 102 with respect to the holder 103 is determined by fitting the swinging rotation axis 102a of the cam plate 102 with the bearing hole 103a provided in the holder 103. Moreover, as shown in FIG. 8, the rotation axes of the rotary potentiometer 107 and the circuit board 106 with respect to the cam plate 102 are determined by fitting the rotating portion 107a of the rotary potentiometer 107 with the swinging rotation axis 102b of the cam plate 102. In this way, the operation unit 10 is constituted so that the rotation axes of the rotary potentiometer 107 and the circuit board 106 with respect to the holder 103 are determined through the position of the cam plate 102.

In addition, as shown in FIG. 8, the urging force by a restoring force of the plate spring portion 703 of the elastic urging portion 702 is applied to the rotary potentiometer 107 in the direction of the arrow 8A. By the restoring force in the direction of the arrow 8A, a force to rotate about the rotation axis is applied to the rotary potentiometer 107. The rigid urging portion 701 comes into contact with the rotary potentiometer 107 so as to receive the force to rotate and applies a force, to the rotary potentiometer 107, in the direction of the arrow 8B which is an opposing direction to the arrow 8A.

Since the rigid urging portion 701 is hard to be deformed whereas the elastic urging portion 702 has a predetermined elasticity and is deformed, the position of the rotary potentiometer 107 in a rotational direction is accurately determined at a contacting position with the rigid urging portion 701. Moreover, the rotary potentiometer 107 is held in a state of coming into contact with the rigid urging portion 701 at all times by the urging force of the elastic urging portion 702. As a result, a clearance between the rotary potentiometer 107 and the rigid urging portion 701 does not appear, and the position of the rotary potentiometer 107 in the rotating direction is constantly held at a fixed position with respect to the rigid urging portion 701.

When the lever 101 is operated from a state of FIG. 8 in which the lever 101 is in the neutral position, the swinging rotation axis 102b and the rotating portion 107a follow and rotate in the operating direction of the lever 101. Even when the swinging rotation axis 102b and the rotating portion 107a rotate, a housing (exterior member) of the rotary potentiometer 107 is held in the neutral position by the elastic urging portion 702 and the rigid urging portion 701. Accordingly, when the lever 101 is operated, the rotating portion 107a alone rotates with respect to the housing of the rotary potentiometer 107, and thus, the rotation amount of the lever 101 from the neutral position is accurately detected.

Although the rotary potentiometer 107 is constantly applied with the forces from the rigid urging portion 701 and the elastic urging portion 702, the forces are applied not to the wiring lead portion 107c but only to the housing of the rotary potentiometer 107. For this reason, a load is not applied on a soldering portion of the wiring lead portion 107c, and a damage so on in the soldering portion is prevented from occurring.

As described above, in the operation unit 10, the misalignment in the positioning of the rotary potentiometer 107 with respect to the lever 101 in the neutral position, which are caused by the mounting misalignment of components and the machining accuracy of the components, is prevented, narrowing of a width of the dead band is realized, and the damage in the soldering portion is avoided.

Figure 9A:
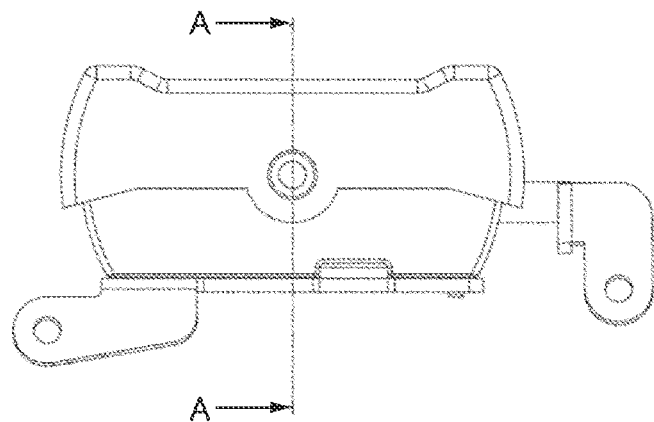
Figure 9B:
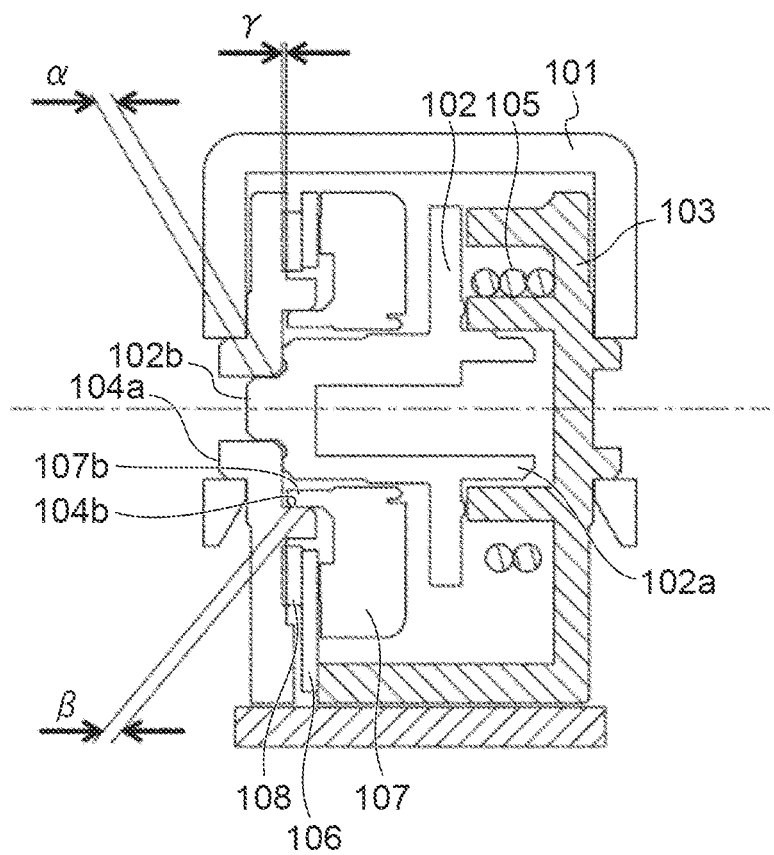

FIG. 9A is a side view of the operation unit 10. FIG. 9B is a cross-sectional view along a line A-A in FIG. 9A. At a time of assembling the operation unit 10, the cam plate 102 to which the neutral spring 105 is attached, the circuit board 106 on which the rotary potentiometer 107 is mounted, the elastic cushion 108, and the cover 104 are assembled to the holder 103 in this order.

In the operation unit 10 thus assembled, an amount of fitting by shafts between the swinging rotation axis 102b of the cam plate 102 and the bearing hole 104a of the cover 104 is defined as a. Moreover, an amount of fitting by sleeves between the sleeve-shaped portion 107b of the rotary potentiometer 107 and the fitting convex portion 104*b* of the cover 104 is defined as β, and an amount of compression of the elastic cushion 108 is defined as γ. In this case, a relation of "the amount of fitting by the shafts α>the amount of fitting by the sleeves β>the amount of compression γ" holds.

For the operation unit 10 having the above dimension relationship, an order of the assembly is set so that the assembly is performed from the components relating to the amount of fitting by the shafts α, which is relatively large, and the compression of the elastic cushion 108 is performed at last. Namely, when the cover 104 is assembled to the holder 103, the fitting by the shafts between the swinging rotation axis 102*b* of the cam plate 102 and the bearing hole 104*a* of the cover 104 is performed first. Subsequently, the fitting by the sleeves between the sleeve-shaped portion 107*b* of the rotary potentiometer 107 and the fitting convex portion 104*b* of the cover 104 is performed. At last, the elastic cushion 108 is compressed.

That is, two fittings comprised of the fitting by the shafts between the swinging rotation axis 102*b* of the cam plate 102 and the bearing hole 104*a* of the cover 104 and the fitting by the sleeves between the sleeve-shaped portion 107*b* of the rotary potentiometer 107 and the fitting convex portion 104*b* of the cover 104 are not started at the same time. By shifting timings to start the two fittings, two fitting portions are prevented from contacting with each other at the same time while the axes of the fitting portions are misaligned. Moreover, a misalignment of the axis of the cam plate 102 is regulated in a first fitting, an amount of misalignment of the axis which occurs when a second fitting, that is, the fitting by the sleeves between the sleeve-shaped portion 107*b* and the fitting convex portion 104*b* is started becomes small. As a result, it is possible to perform the fitting by the sleeves by easily and finely adjusting a center of the axis.

Furthermore, after the two fittings comprised of the fitting by the shafts between the swinging rotation axis 102*b* and the bearing hole 104*a* and the fitting by the sleeves between the sleeve-shaped portion 107*b* and the fitting convex portion 104*b* are performed, the elastic cushion 108 is compressed. If the two fitting portions are pressed by the elastic cushion 108 while the axes of the two fitting portions are misaligned due to the rattling of the cam plate 102 and so on, the fitting shaft and the fitting sleeve collide with an opening of the cover 104, and a damage or a dent may occur. However, such damages are prevented from occurring by assembling the operation unit 10 in the order as described above.

By assembling the operation unit 10 with the relation of "the amount of fitting by the shafts α>the amount of fitting by the sleeves β>the amount of compression γ", it is possible to prevent that the cover 104 is assembled to the holder 103 while the axes of the two fitting portions remained misaligned. As a result, a sliding motion between the cam plate 102 and the cover 104 and a sliding motion between the rotary potentiometer 107 and the cover 104 during the rotating operation of the lever 101 become stable, the rotation amount of the lever 101 is accurately detected.

Second Embodiment

Figure 10:
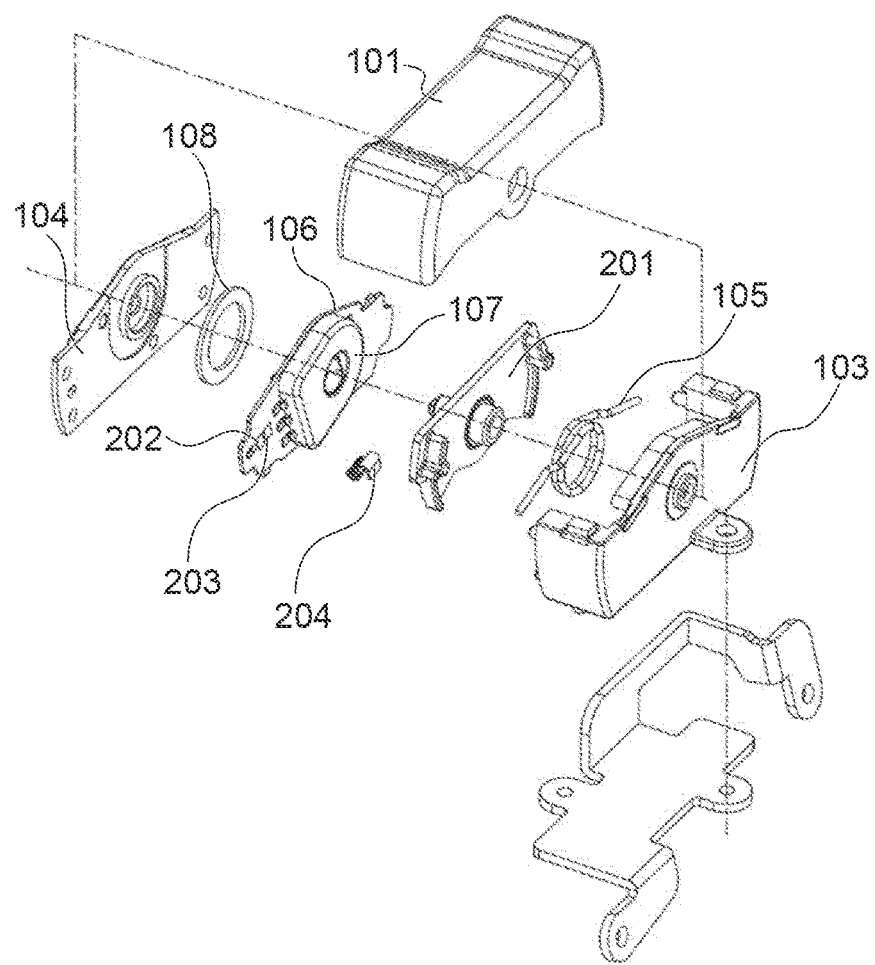
FIG. 10 is an exploded perspective view of an operation unit according to a second embodiment of the present invention.
Figure 11A:
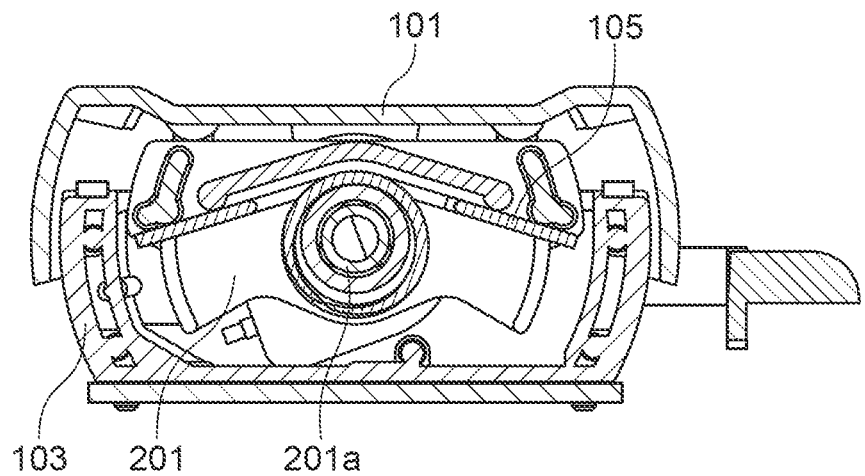
FIGS. 11A to 11C are cross-sectional views of the operation unit in FIG. 10.
Figure 11B:
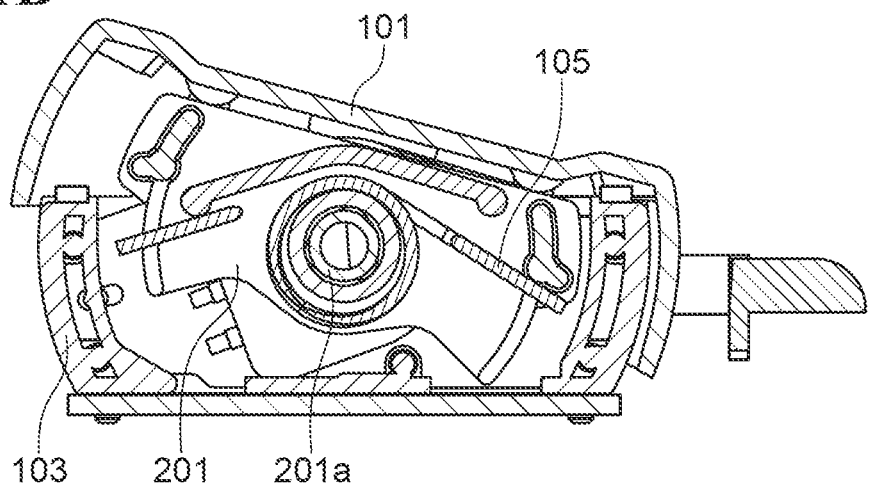
Figure 11C:
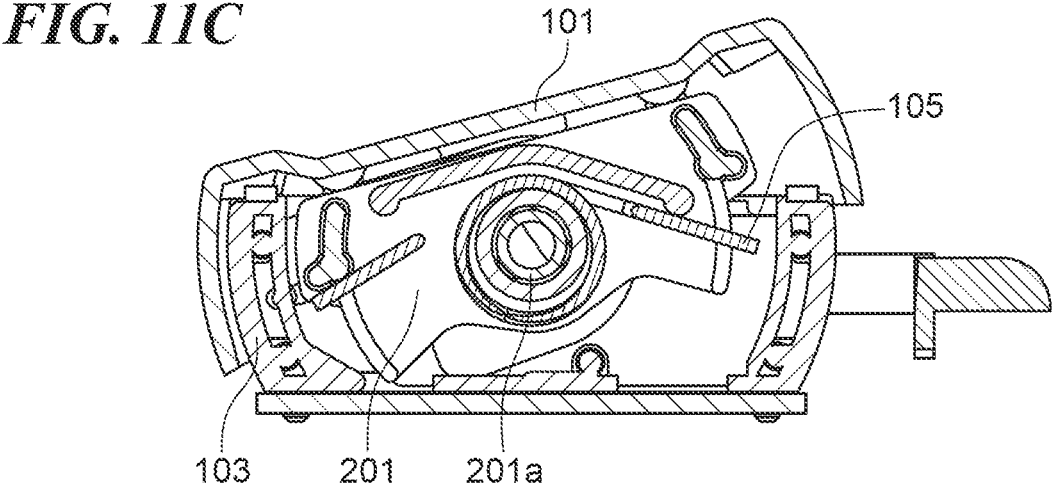
Figure 12A:
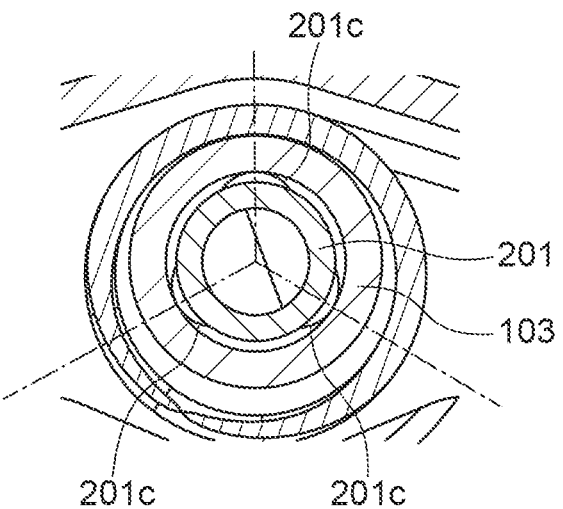
FIGS. 12A to 12C are partial enlarge views of the cross-sectional views in FIGS. 11A to 11C.
Figure 12B:
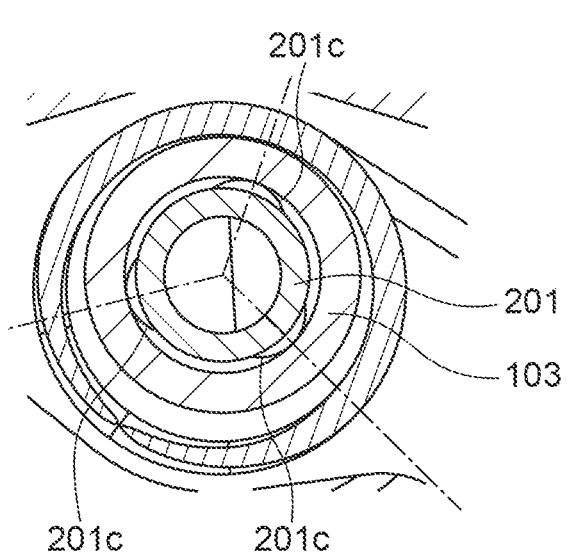
Figure 12C:
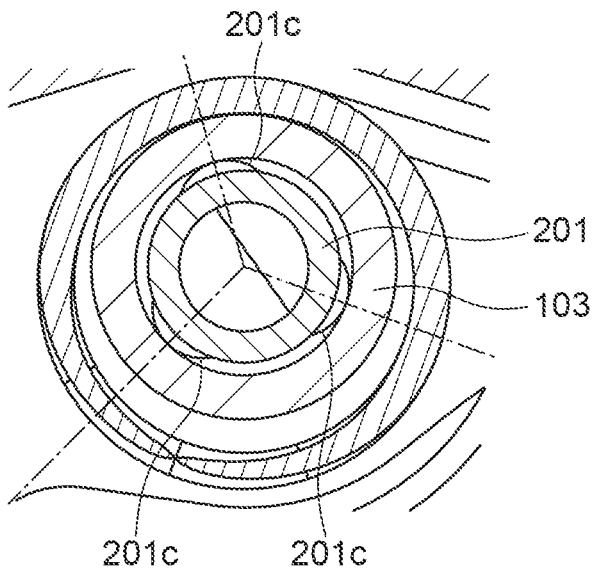

FIG. 10 is an exploded perspective view of an operation unit 10A according to a second embodiment. It should be noted that among components of the operation unit 10A, same components as that of the operation unit 10 are noted by the same reference numerals, and explanations thereof are omitted here. FIGS. 11A to 11C are cross-sectional views of main components of the operation unit 10A. FIG. 11A is a cross-sectional view in a state where the lever 101 is in the neutral position. FIG. 11B is a cross-sectional view in a state where a right side of the lever 101 is pressed down, and the lever 101 is rotated to the rotation limit in the CW direction. FIG. 11C is a cross-sectional view in a state where a left side of the lever 101 is pressed down, and the lever 101 is rotated to the rotation limit in the CCW direction. FIGS. 12A to 12C are enlarged views of rotation axis portions in FIGS. 11A to 11C, respectively.

In a radial direction of a base of a swinging rotation axis 201*a* of a cam plate which constitutes the 10A, a three-point protrusions 201*c* (point receiving portions), which rotatably fit with an inner diameter of the bearing portion 103*b* of the holder 103, are provided as shown in FIG. 12A. Since the fitting by the shafts has point contacts by the three-point protrusions 201*c*, a sliding friction which occurs while the cam plate 201 is swinging is reduced. Phases of the three-point protrusions 201*c* are arranged so that three-points are substantially trisected (each 120° spaced) with one point at a top in the neutral position. Accordingly, the operation unit 10A is configured so that only one of the three-point protrusions 201*c* is not positioned at the lowest point (the negative direction in the Z-axis) in swingable ranges of 15° in both the CW direction and the CCW direction, respectively, from the neutral position of the cam plate 201.

The lever 101 receives a static pressure and an impact at an angle within the rotation range including the neutral position in a case where, for example, a prescribed static pressure is applied on the lever 101 in a state where the operation unit 10A is assembled to an electronic device or a case where a downward drop impact is given to the lever 101. Since the static pressure and the impact in these cases are not intensively received by one point of the three-point protrusions 201*c* but are received by two points of the three-point protrusions 201*c*, the three-point protrusions 201*c* is not easily deformed. It should be note that, although not shown in the figure, even when a plurality of (three or more) protrusions similar to the three-point protrusions 201*c* is provided on an inner diameter side of the bearing portion 103*b* of the holder 103, and the swinging rotation axis 201*a* is formed as a simple cylindrical shape, the similar effect is obtained.

Figure 13:
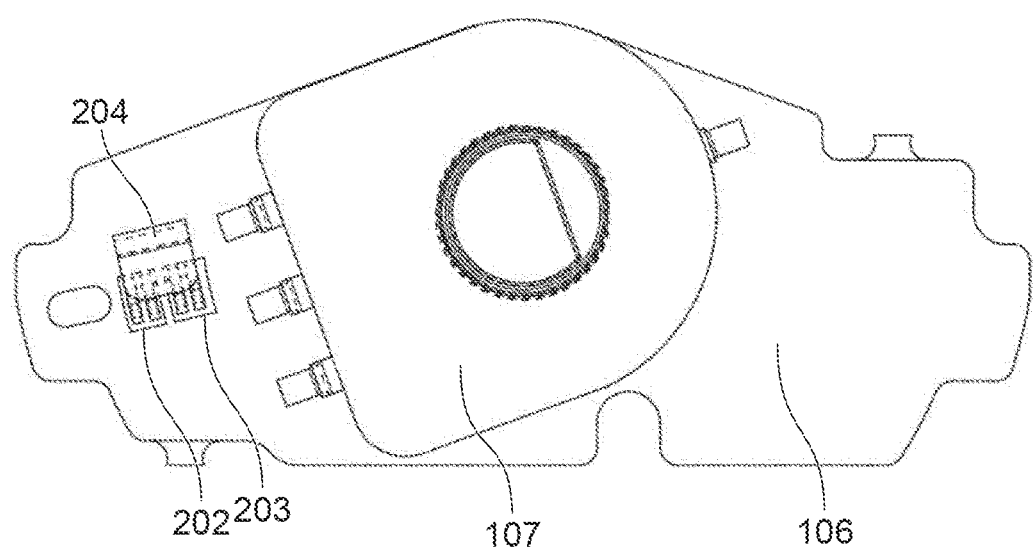
FIG. 13 is a view showing a state in which a rotary potentiometer is mounted on a circuit board in the operation unit in FIG. 10.

FIG. 13 is a view showing a state where the rotary potentiometer 107 is mounted on the circuit board 106. On a mounting surface of the circuit board 106 on which the rotary potentiometer 107 is mounted, two circuit patterns of a signal pattern portion 202 and a ground signal pattern portion 203 whose surfaces are gold-plated are exposed. A contact piece brush 204 which contacts the two circuit patterns is fixed to a surface of the cam plate 201 which faces the mounting surface of the circuit board 106. FIG. 13 shows a state in which the lever 101 is in the neutral position, and in this state, the signal pattern portion 202 and the ground signal pattern portion 203 are conductive with each other by the contact piece brush 204. The contact piece brush 204 swings integrally with the cam plate 201, and comes out of an area of the signal pattern portion 202 and the ground signal pattern portion 203 by a predetermined swinging amount to reach a singing end.

Figure 14:
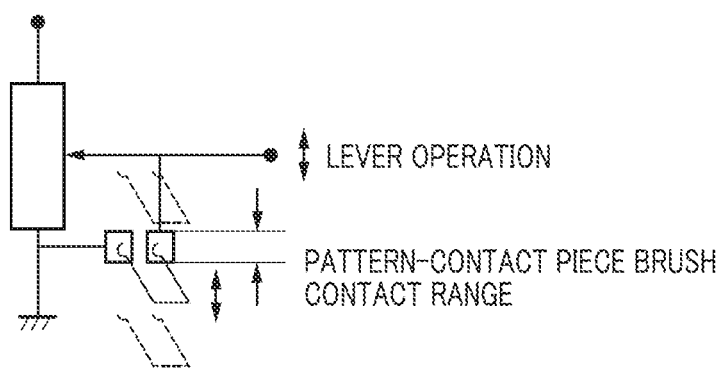
FIG. 14 is an electrical diagram of the operation unit in FIG. 10.
Figure 15:
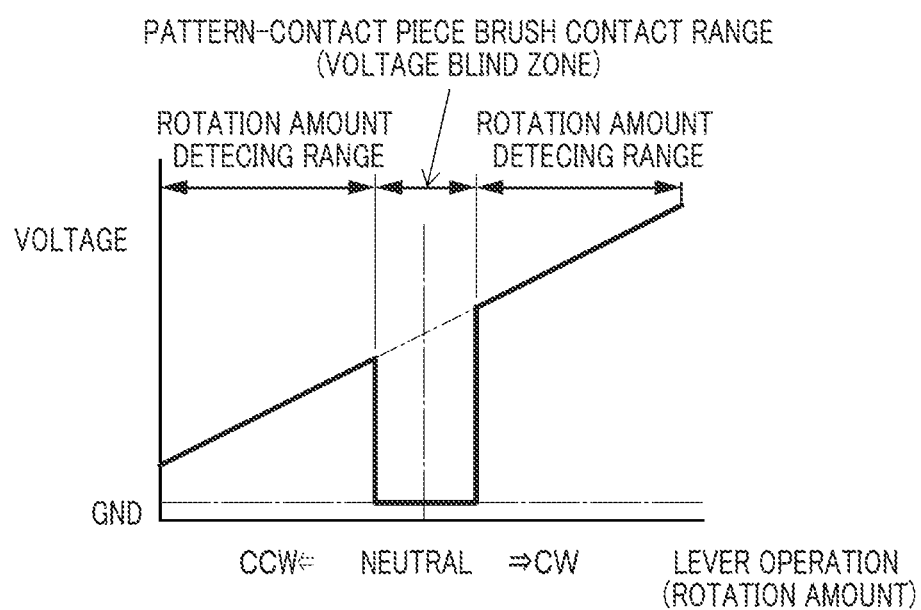
FIG. 15 is a diagram showing a relationship between a rotation amount of a lever in the operation unit and an output voltage from the rotary potentiometer.

FIG. 14 is an electrical diagram of the operation unit 10A. FIG. 15 is a diagram showing a relationship between a rotation amount of the lever 101 and an output voltage from the rotary potentiometer 107. In the rotatable range of the lever 101, the rotary potentiometer 107 outputs the voltage signal so that the voltage changes linearly with respect to the rotation amount of the lever 101. However, in a case where the lever 101 is positioned within a predetermined angle range with the neutral position at its substantial center, the contact piece brush 204 contacts the signal pattern portion 202 and the ground signal pattern portion 203, and the signal pattern portion 202 and the ground signal pattern become conductive with each other as shown in FIG. 14. As a result, in a range where the signal pattern portion 202 and the ground signal pattern portion 203 become conductive with each other, the output signal detected as an output from the rotary potentiometer 107 drops to a GND potential as shown in FIG. 15. Accordingly, the range in which the voltage signal drops to the GND potential corresponds to the voltage blind zone.

Namely, as explained also in the first embodiment, it is necessary to set a predetermined swinging range including the neutral position of the lever 101 as the voltage blind zone in order to prevent an occurrence of a misdetection at a time of non-operation of the lever 101. Therefore, in the operation unit 10A, a potential output from the rotary potentiometer 107 within a predetermined range including the neutral position of the lever 101 is intentionally dropped to the GND potential, and the range where the GND potential is detected is defined as the voltage blind zone.

In the operation unit 10 in the first embodiment, the voltage blind zone is set for a value of the output voltage within the predetermined range from the rotary potentiometer 107. On the other hand, the voltage blind zone in the operation unit 10A is set by the circuit patterns provided on the circuit board 106, a factor of a variation and so on in the operating environment does not exist, and thus it becomes possible to narrow the range where the GND potential is detected. Moreover, narrowing the range where the GND potential is detected enables enlarging a rotation amount detecting range from an end of the voltage blind zone to an end of a detection range.

Therefore, in a case where the operation unit 10A is used for a zoom operation unit of a video camera and so on, it is possible to subdivide a resolution for gradually changing a zooming operation speed in an image pickup optical system within the rotation amount detecting range of the lever 101 and variably set the zooming operation speed more finely. On the other hand, in a case where the resolution for gradually changing the zooming operation speed is set constant, a step size of the resolution can be widened because the rotation amount detecting range is wide. As a result, a sensitivity which gradually changes the zooming operation speed of the image pickup optical system at a time of operating the lever 101 can be reduced.

Third Embodiment

Figure 16A:
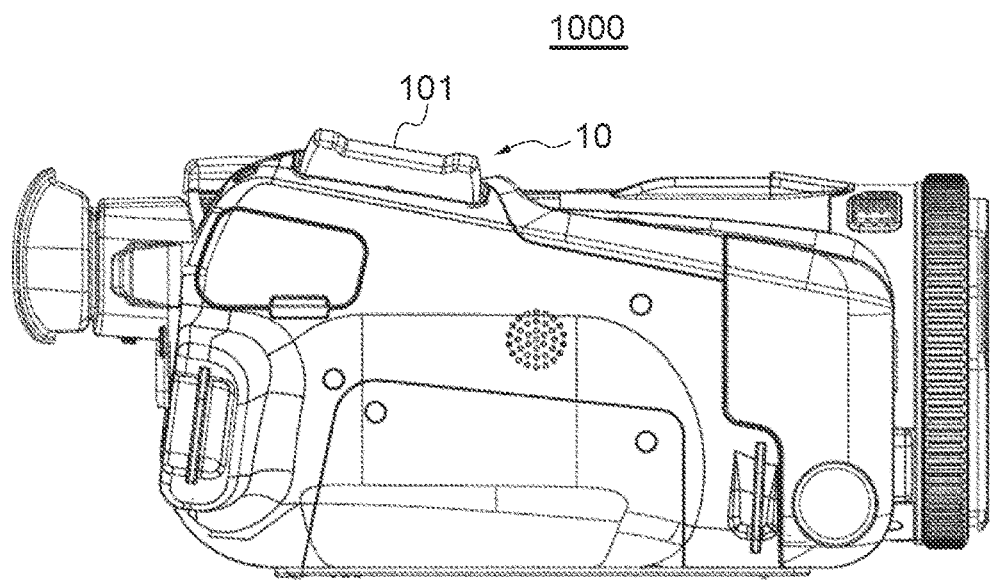
Figure 16B:
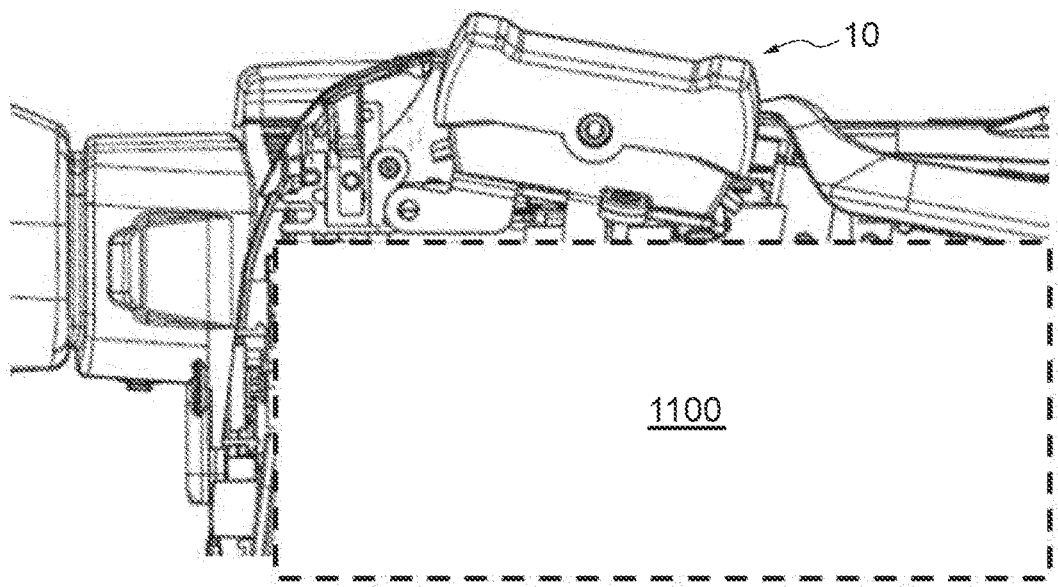

In a third embodiment, a description will be given of a configuration of a video camera which is an image pickup apparatus on which the operation unit operation unit 10 according to the first embodiment is mounted. FIG. 16A shows an external side view of the video camera 1000 on which the operation unit 10 is mounted. FIG. 16B shows a partial cross-sectional view of the video camera 1000 and shows a mounting state of the operation unit 10.

The operation unit 10 is arranged at a position in an upper portion of the video camera 1000 where the operation unit 10 is operable by a finger of a hand of a user which holds a main body of the video camera 1000. Moreover, the operation unit 10 is arranged by being inclined forward with respect to the main body of the video camera 1000 so as to make it easier for the user to operate. Since the operation unit 10 is configured in such a way that the size in the direction of the Z-axis is short, a space 1100 in the main body of the video camera 1000 is effectively used, and therefore, downsizing of the main body of the video camera 1000 is realized.

Fourth Embodiment

In the fourth embodiment, a description will be given of a seesaw type operation unit including a slide type potentiometer. As is the case of a seesaw type operation unit disclosed in Japanese Patent No. 5,502,415, it is known the seesaw type operation unit which detects a phase by using a slide type potentiometer so as to improve endurance of a resistance band. In the seesaw type operation unit disclosed in Japanese Patent No. 5,502,415, the potentiometer is arranged in a direction of facing an operation lever via a rotation axis of the operation lever. However, in a case where the slide type potentiometer is arranged in the direction of facing the operation lever via the rotation axis, there is a problem that a structure of an operating portion of the seesaw type operation unit is upsized. In the present embodiment, a description will be given of the seesaw type operation unit capable of downsizing the structure of the operating portion even when the slide type potentiometer is used.

Figure 17A:
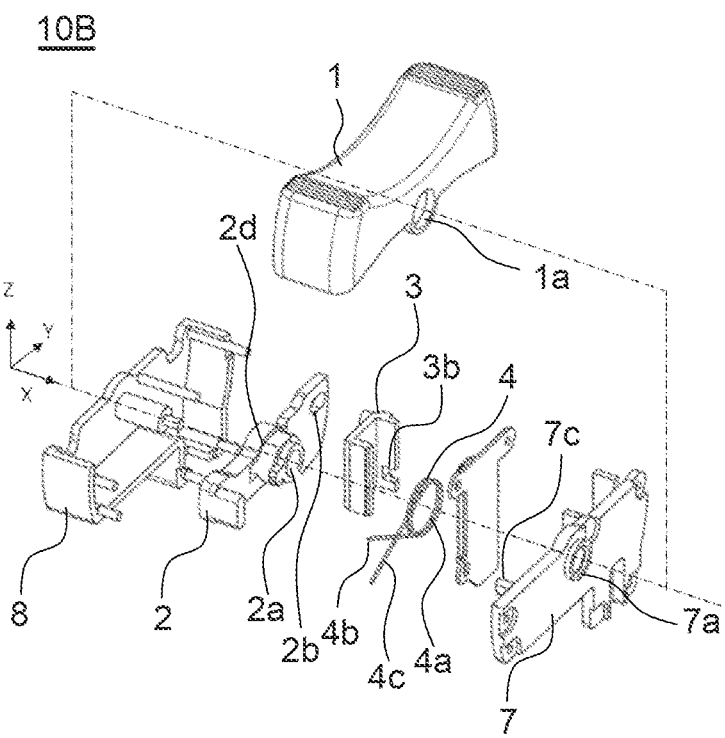
FIGS. 17A and 17B are partial perspective views of an operation unit according to a fourth embodiment of the present invention.
Figure 17B:
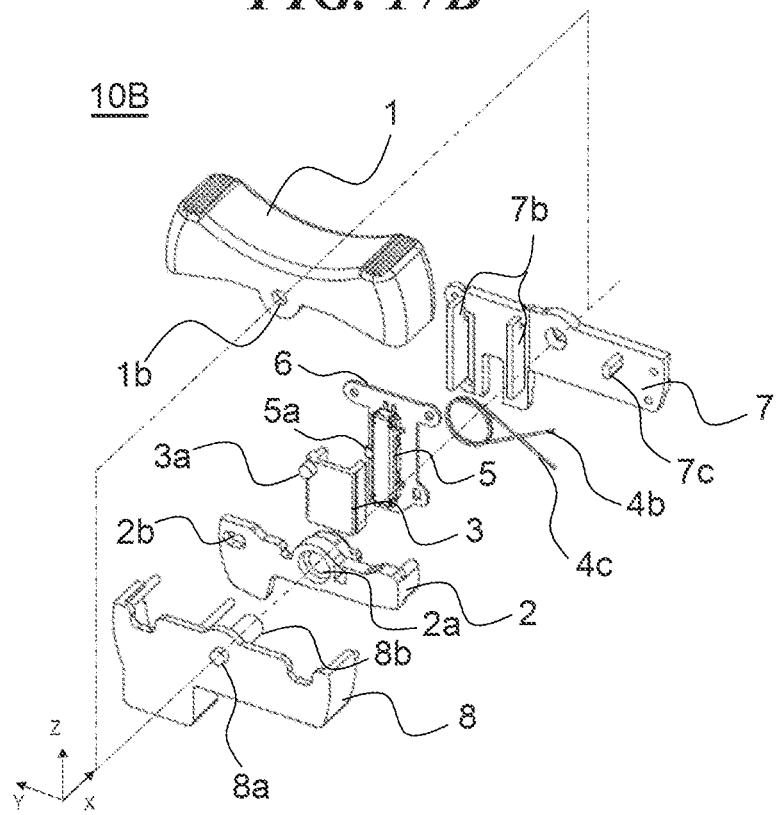

FIGS. 17A and 17B are partial perspective views of the seesaw type operation unit 10B according to the fourth embodiment. FIG. 17A is a partial perspective view of the operation unit 10B when viewed from a front side, and FIG. 17B is a partial perspective view of the operation unit 10B when viewed from a back side.

An operation lever 1 as an operation member includes two through holes 1a and 1b which are centers of a swinging rotation. A through hole on the front side is referred to as the through hole 1a, and a through hole on the back side is referred to as the through hole 1b. A plate-shaped cam plate 2 is arranged below the operation lever 1. The cam plate 2 is provided co-axially with the operation lever 1 and rotates in association with rotation of the operation lever 1. The cam plate 2 as a rotation plate includes a through hole 2a which is a rotation center when the cam plate 2 rotates. The through hole 2a protrudes forwardly from a front side of the cam plate 2 and is provided in a center portion for rotation.

A slide cam 3 is arranged on the front side of the cam plate 2. The slide cam 3 includes a protruding portion 3a for driving on its back side. The slide cam 3 operates in association with the rotation of the cam plate 2 as a result of engagement of the protruding portion 3a of the slide cam 3 with a long hole portion 2b of the cam plate 2. An operating portion 5a of the slide type potentiometer 5 engages with a concave-shaped switch holding portion 3b of the slide cam 3.

The slide type potentiometer 5 is mounted on a circuit board 6 (FIG. 17B). Since the operating portion 5a of the slide type potentiometer 5 engages with the switch holding portion 3b of the slide cam 3, the operating portion 5a linearly moves with a sliding motion of the slide cam 3. A variable resistance value of the slide type potentiometer 5 changes with the motion of the operating portion 5a of the slide type potentiometer 5. A rotation state (rotation amount) of the operation lever 1 is detected based on the resistance value of the slide type potentiometer 5, which is a variable resistor.

The cam plate 2 includes an around-axis cylindrical portion 2d. The around-axis cylindrical portion 2d fits with a circular portion (coil portion) 4a of a neutral spring 4, which is an urging member, and holds the neutral spring 4. The circuit board 6 is electrically connected to a power supply circuit board of a main body of the electronic device to which the seesaw type operation unit 10B is applied via a wiring such as a wire.

The cam plate 2, the slide cam 3, the slide type potentiometer 5, and the circuit board 6 are assembled so that those components are sandwiched by a cover 7 on the front and a holder 8 on the back. The cover 7 and the holder 8 are fixed by, for example, a heat sealing with components being sandwiched inside. An axis 7a with which the through hole 1a of the operation lever 1 engages is provided in the cover 7. An axis 8a with which the through hole 1b of the operation lever 1 engages is provided in the holder 8. The operation lever 1 is rotatably supported by the axis 7a of the cover 7 and the axis 8a of the holder 8.

The cover 7 is provided with a spring hooking portion 7c which holds arm portions of the neutral spring 4. In a case where the operation lever 1 is in a neutral position (neutral state), an arm portion 4b and an arm portion 4c engage with the spring hooking portion 7c so that the arm portions 4b and 4c sandwich the spring hooking portion 7c. A cam axis 8b is provided inside the holder 8. The cam plate 2 is rotatably supported by the through hole 2a of the cam plate 2 engaging with the cam axis 8b. The cover 7 is also provided with two ribs which face with each other, and the two ribs function as guides 7b. The guides 7b guide the slide cam 3. The slide cam 3 moves linearly and vertically in the FIGS. 17A and 17B by sliding between the guides 7b.

Figure 18:
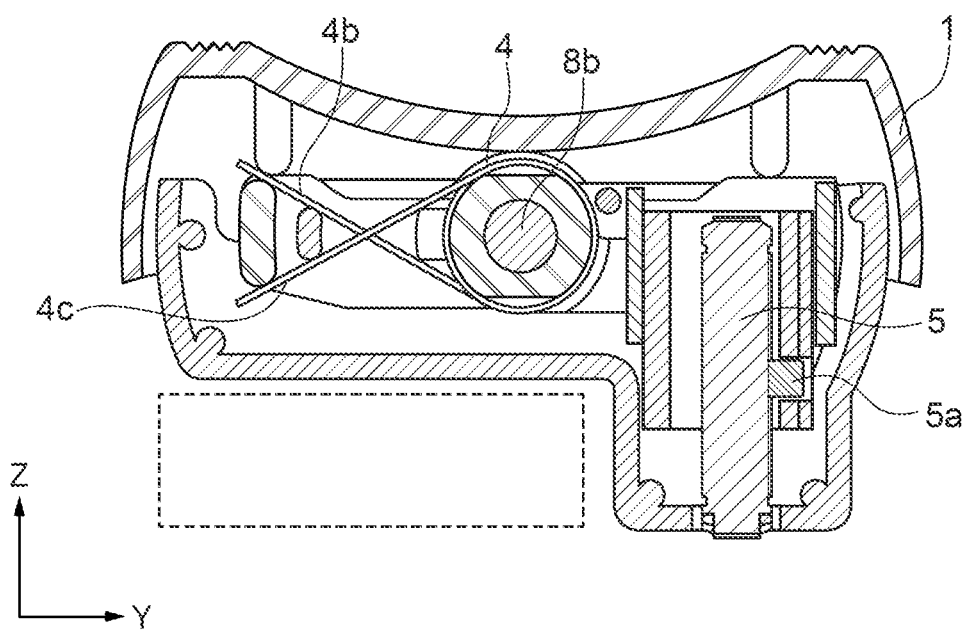
FIG. 18 is a vertical cross-sectional view of the operation unit in FIGS. 17A and 17B.

FIG. 18 is a vertical cross-sectional view of the operation unit 10B in FIGS. 17A and 17B. An inner structure of the operation unit 10B will be explained in detail by referring to FIG. 18.

In FIG. 18, the slide type potentiometer 5 is arranged on a right side of an axial portion (cam axis 8b) which is a rotation center of the operation lever 1. That is, the slide type potentiometer 5 is vertically arranged at a position below the operation lever 1 and along a direction perpendicular to a longitudinal direction of the operation lever 1 (a horizontal direction in FIG. 18).

An upper end portion of the slide type potentiometer 5 is arranged at a position above a lower end portion of the operation lever 1 as shown in FIG. 18. In other words, the slide type potentiometer 5 is vertically arranged so that the upper end portion is inserted into the box-shaped or cup-shaped operation lever 1, which opens its lower side, from the lower side of the box-shaped or cup-shaped operation lever 1. In this manner, the slide type potentiometer 5 is arranged parallel to a direction of a Z-axis, and the operating portion 5a of the slide type potentiometer 5 vertically moves in FIG. 18.

The neutral spring 4 is arranged along a horizontal direction in FIG. 18, and the arm portion 4b and the arm portion 4c of the neutral spring 4 are positioned in a direction opposite to the slide type potentiometer via the cam axis 8b. Moreover, as with the slide type potentiometer 5, the neutral spring 4 is arranged so that a part of the neutral spring 4 is positioned above the lower end portion of the operation lever 1 and the neutral spring 4 partially overlaps with the operation lever 1 as shown in FIG. 18.

By arranging the upper end portion of the slide type potentiometer 5 and the part of the neutral spring 4 inside the operation lever 1 so that the upper end portion of the slide type potentiometer 5 and the part of the neutral spring 4 overlap with the operation lever 1 as shown in the vertical cross-sectional view of FIG. 18, a structure of an operating portion of the operation unit 10B is prevented from being upsized, and downsizing of the operation unit 10 is realized.

Next, a description will be given of an operating state in which the lever 1 of the operation unit 10B rotates.

Figure 19A:
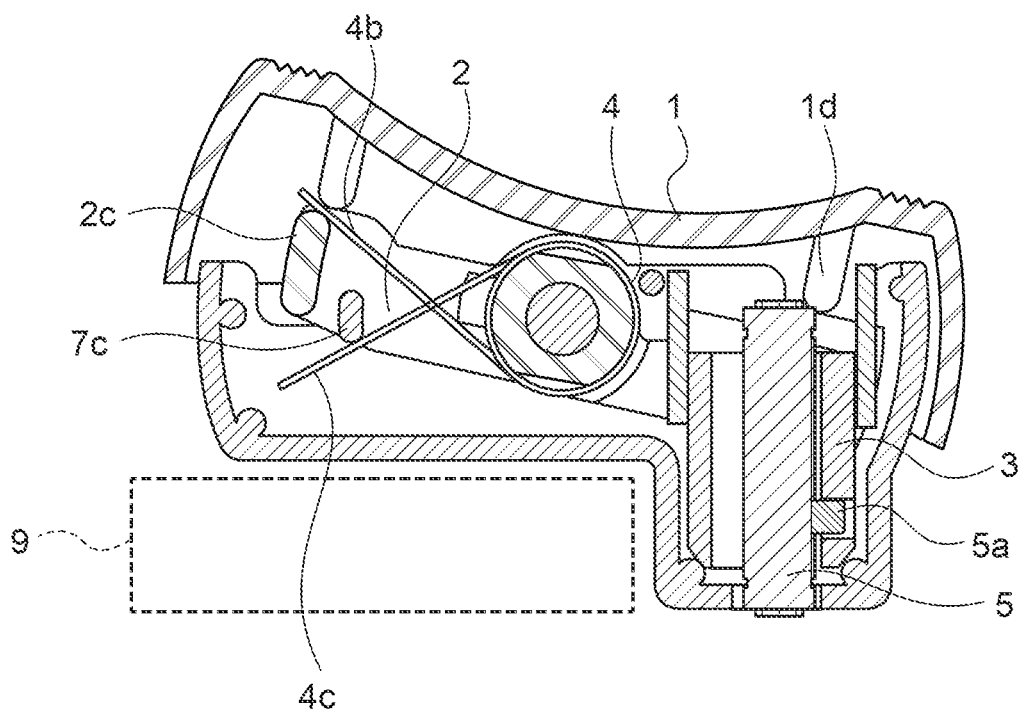
FIGS. 19A and 19B are vertical cross-sectional views showing operating states of the operation unit in FIGS. 17A and 17B.
Figure 19B:
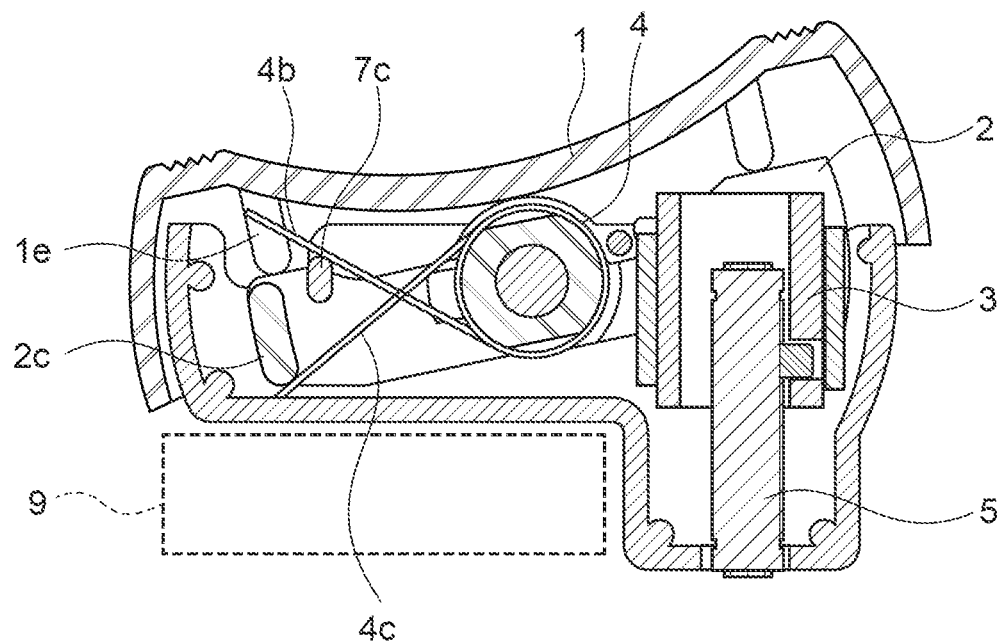

FIGS. 19A and 19B are vertical cross-sectional views showing operating states of the operation unit 10B. FIG. 19A is a vertical cross-sectional view showing a state in which the operation lever 1 is rotated in the CW direction, and FIG. 19B is a vertical cross-sectional view showing a state in which the operation lever 1 is rotated in the CCW direction.

In FIG. 19A, the operation lever 1 includes a cam operating portions 1d and 1e which press down both end portions of the cam plate 2, respectively. The cam operating portions 1d and 1e function as a rotation plate operating portion. That is, when the operation lever 1 is rotated in the CW direction, the cam operating portion 1d provided inside the operation lever 1 presses down a right end portion of the cam plate 2 in a rotational direction of the operation lever 1, and the cam plate 2 rotates in the CW direction. When the cam plate 2 rotates in the CW direction, the slide cam 3 which engages with the cam plate 2 is pressed down, and the operating portion 5a of the slide type potentiometer 5 moves downward. In this case, the arm portion 4c which faces downward between the arm portions of the neutral spring 4 is supported and kept fixed by the spring hooking portion 7c of the cover 7. On the other hand, the arm portion 4b which faces upward is pushed up by a spring receiving portion 2c of the cam plate 2 and urges the neutral spring 4. When the neutral spring 4 is being urged, a force to return the operation lever 1 to the neutral position is applied to the operation lever 1.

Whereas, when the operation lever 1 is rotated in the CCW direction as shown in FIG. 19B, the cam operating portion 1e provided inside the operation lever 1 presses down a left end portion of the cam plate 2 in the rotational direction of the operation lever 1. The cam plate 2 whose left end portion is pressed down rotates in the CCW direction. When the cam plate 2 rotates in the CCW direction, the slide cam 3 is pushed up, and the operating portion 5a of the slide type potentiometer 5 moves upward. In this case, the arm portion 4b of the neutral spring 4 which faces upward is supported and kept fixed by the spring hooking portion 7c of the cover 7. On the other hand, the arm portion 4c which faces downward is pushed up by the spring receiving portion 2c of the cam plate 2 and urges the neutral spring 4. When the neutral spring 4 is being urged, the force to return the operation lever 1 to the neutral position is applied to the operation lever 1.

According to the present embodiment, the slide type potentiometer 5 is vertically arranged at the position which is below the operation lever 1 and shifts from the rotation axis of the operation lever 1, and along the direction perpendicular to the longitudinal direction of the operation lever 1. With this arrangement, a size of a left-side portion in the direction of the Z-axis in which the neutral spring 4 is arranged as shown in FIGS. 19A and 19B can be downsized. That is, since an area 9 which is shown by a broken line in FIGS. 19A and 19B becomes empty, downsizing of the 10B, moreover, an electronic device equipped with the 10B, for example, an image pickup apparatus can be realized. It should be noted that in the present embodiment, an angle between a longitudinal direction of the slide type potentiometer 5 and the longitudinal direction of the 1 is perpendicular. However, the slide type potentiometer 5 may be tilted with respect to the operation lever 1. The same effect can be obtained as long as the angle between the longitudinal direction of the slide type potentiometer 5 and the longitudinal direction of the operation lever 1 is larger than an angle between a short direction of the slide type potentiometer 5 and the longitudinal direction of the operation lever 1. Moreover, when the slide type potentiometer 5 is tilted, a size of a part in the direction of the Z-axis (a right-side portion in FIGS. 19A and 19B) in which the slide type potentiometer 5 is arranged can be downsized. However, when the slide type potentiometer 5 is tilted too much, the size in the lateral direction of the empty area 9 shown by the broken line becomes small. Thus, it is preferably to set the angle between the longitudinal direction of the slide type potentiometer 5 and the longitudinal direction of the operation lever 1 not less than 60° and not more than 120°, and more preferably, not less than 80° and not more than 100°.

Fifth Embodiment

In the fifth embodiment, a description will be given of a configuration of a video camera which is an image pickup apparatus to which the operation unit 10B according to the fourth embodiment is mounted.

Figure 20A:
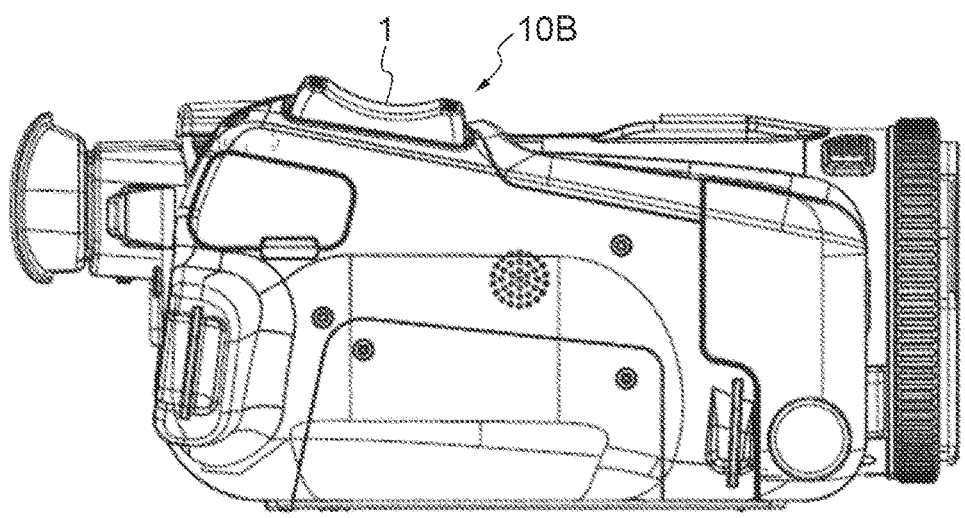
Figure 20B:
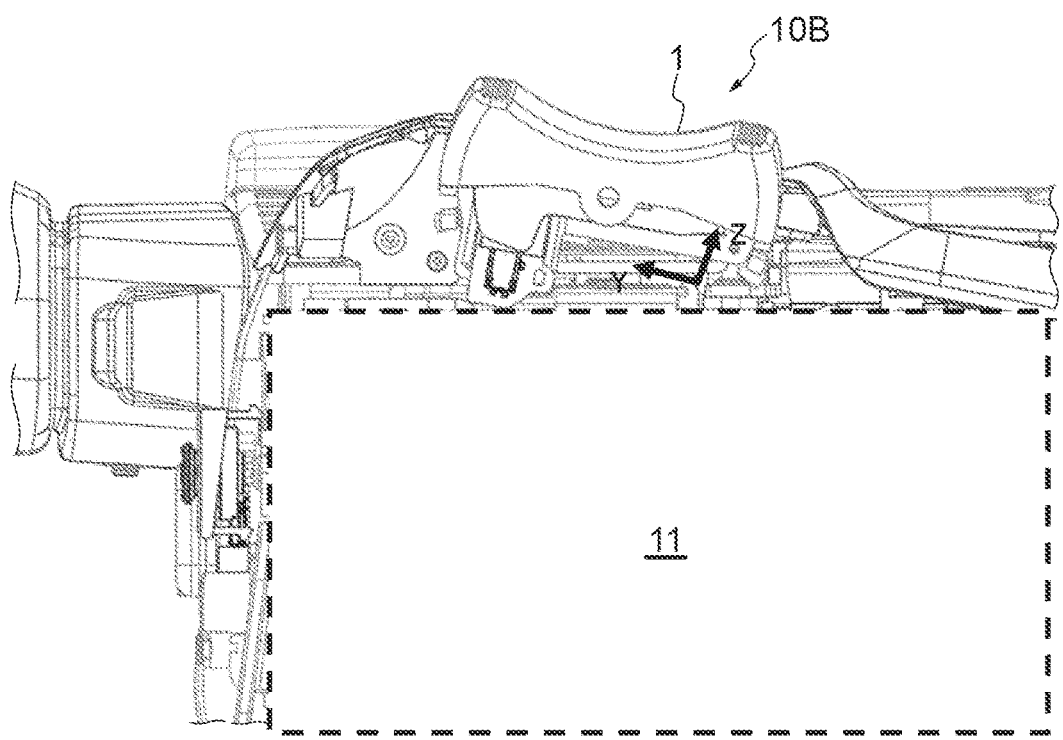

FIG. 20A shows an external side view of a video camera 2000 on which the operation unit 10B is mounted, and FIG. 20B shows a partial cross-sectional view showing an inner configuration of the video camera 2000 to which the operation unit 10B is mounted.

In FIG. 20A, the operation unit 10B is arranged at a position in an upper portion of the video camera 2000 where the operation unit 10B is operable by a finger of a hand of a user which holds a main body of the video camera 2000. Moreover, the operation unit 10B is arranged by being inclined forward with respect to the main body of the video camera 2000 so as to make it easier for the user to operate. That is, the operation unit 10B is arranged by being inclined forward so that a subject side of the operation unit 10B is low and a user side of the operation unit 10B is high.

In FIG. 20B, the operation unit 10B is arranged so that a spring side of the operation unit 10B (a negative side of the Y-axis) is positioned on a front side (the subject side) of the video camera 2000 and a slide type potentiometer 5 side of the operation unit 10B (a positive side of the Y-axis) is positioned on a rear side (the user side) of the video camera 2000. Accordingly, the operation unit 10B can be arranged with respect to a main body of the video camera 2000 without intruding into internal components 11 (not shown) such as a circuit board arranged parallel to the operation unit 10B, and thus, downsizing of the video camera 2000 is realized.

When the operation unit 10B is attached to the main body of the video camera 2000, the empty area (refer to FIGS. 19A and 19B) which is formed at a lower left side of the operation unit 10B is provided with a speaker or an exhaust port, for example.

By arranging the speaker in the empty area 9, a sound is produced from a gap between the operation lever 1 and a cover of the video camera 2000. Accordingly, a speaker hole is dispensed with. For this reason, the designability can be easily maintained. Moreover, this arrangement is also favorable because the speaker hole comprised of the gap between the operation lever 1 and the cover is not covered when the user holds the main body of the video camera 2000.

In addition, if an exhaust port is provided in the empty area 9 below the operation unit 10B, the following effect is obtained. That is, the operation unit 10B is arranged at a substantially center part of the main body of the video camera 2000. Moreover, by providing the exhaust port in a lower part of the main body of the video camera 2000, an intake port can be arranged in the vicinity of a heat source such as a main board. As a result, it is expectable to enhance a heat exhausting effect. Furthermore, since the finger of the user reaches for the operation lever 1 during the zooming operation, the exhaust port provided below the operation lever 1 is not covered with the finger, and a heat exhausting operation is not disturbed.

According to the present embodiment, the operation unit 10B is inclined forward with respect to the main body of the video camera 2000. Moreover, the operation unit 10B is installed so that the slide type potentiometer 5 side of the operation unit 10B is placed at the rear side of the video camera 2000. Therefore, the operation lever 1 does not excessively protrude in terms of an outer shape of the video camera 2000, and downsizing of the video camera 2000 as a whole is realized.

Further, by arranging the speaker or the exhaust port in the empty area 9 which is located on the lower left side of the operation unit 10B, the empty area 9 is effectively used without interfering the function of the speaker or the exhaust port.

It should be noted that, for example, each of the operation units according to the present invention may be used for an input means which not only performs the zooming operation but performs a variable input such as focusing in a case where the operation unit is mounted on the video camera. Moreover, each of the operation units according to the present invention may be used for an input means of an electronic device in general which includes a driving unit (driver) that requires a variable input and performs a predetermined operation depending on an input value.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2020-025439, filed Feb. 18, 2020 and Japanese Patent Application No. 2020-027020, filed Feb. 20, 2020, which are hereby incorporated by reference herein in their entirety.

What is claimed is:

1. An operation unit comprising:
a swinging member capable of swinging in a predetermined direction with a rotation axis at a center;
an urging member that urges the swinging member to a neutral position;
a detector that includes a rotating portion which is arranged coaxially with the rotation axis and rotates integrally with the swinging member, and outputs a signal depending on a rotation amount of the rotating portion;
a circuit board on which the detector is mounted;
an operating member that receives an operation from an outside and causes the swinging member to rotate in the predetermined direction by the operation;
a supporting member that rotatably supports the swinging member and the operating member coaxially with each other; and
an elastic member that is arranged in a state of being compressed between the circuit board and the supporting member and suppresses a rattling of the circuit board,
wherein in a case where the operating member is rotated in the predetermined direction, the operating member pushes an end of the swinging member to rotate the operating member, the swinging member, and the rotating portion integrally with one another.

2. The operation unit according to claim 1, wherein the supporting member swingably supports the swinging member and the operating member at different positions, respectively.

3. The operation unit according to claim 1, wherein the detector includes a wiring lead which protrudes in one direction,
the swinging member has a rotation limit, and
the detector is arranged so that an angle of the swinging member at the rotation limit and an orientation of the wiring lead are parallel to each other.

4. The operation unit according to claim 1, further comprising:
an amplifier that amplifies a signal output from the detector; and
a converter that converts the signal amplified by the amplifier into a digital value,
wherein a range of an output voltage from the amplifier is smaller than a range of an input voltage in the converter.

5. The operation unit according to claim 4, wherein the amplifier includes an adjustor that adjusts a center voltage at a time of amplifying the signal output from the detector.

6. The operation unit according to claim 1, wherein the detector includes a fitting portion which fits a housing of the detector with the supporting member,
an amount of fitting distance by shafts between the rotation axis of the swinging member and the supporting member is larger than a fitting distance amount between the housing and the supporting member, and
an amount of compression distance of the elastic member is smaller than the fitting distance amount between the housing and the supporting member.

7. The operation unit according to claim 1, wherein the swinging member is provided with a contact piece, and
the circuit board includes a signal pattern portion which changes a voltage of the signal output from the detector in a case where the swinging member is positioned at a predetermined angle including the neutral range into a predetermined value through conduction via the contact piece.

8. The operation unit according to claim 1, further comprising a rigid urging portion and an elastic urging portion that hold a housing of the detector,
wherein by the elastic urging member urging the housing into a direction same as a one rotational direction of the rotating portion and the rigid urging member urging the housing into an opposite direction to the one rotational direction, the housing is kept in a state same as a state in which the swinging member is in a neutral position in a case where the swinging member is rotated in the predetermine direction from the neutral direction.

9. The operation unit according to claim 1, wherein the rotation axis of the swinging member is supported by the supporting member at points provided by a plurality of point receiving portions, and
the plurality of point receiving portions is arranged so that only one of the plurality of point receiving portions is not positioned at the lowest in a range in which the swinging member is rotatable.

10. An electronic device, comprising:
an operation unit; and
a driver that performs a predetermine operation in accordance with a signal output from a detector of the operation unit,
wherein the operation unit includes a swinging member capable of swinging in a predetermined direction with a rotation axis at a center, an urging member that urges the swinging member to a neutral position, the detector that includes a rotating portion which is arranged coaxially with the rotation axis and rotates integrally with the swinging member, and outputs a signal depending on a rotation amount of the rotating portion, a circuit board on which the detector is mounted, an operating member that receives an operation from an outside and causes the swinging member to rotate in the predetermined direction by the operation, a supporting member that rotatably supports the swinging member and the operating member coaxially with each other, and an elastic member that is arranged in a state of being compressed between the circuit board and the supporting member and suppresses a rattling of the circuit board, and
in a case where the operating member is rotated in the predetermined direction, the operating member pushes an end of the swinging member to rotate the operating member, the swinging member, and the rotating portion integrally with one another.

11. The operation unit according to claim 1, wherein
the elastic member is arranged in a state of being compressed,
an amount of fitting distance by shafts between the swinging member and the supporting member is larger than an amount of compression distance of the elastic member.

* * * * *